United States Patent [19]

McDaniel

[11] Patent Number: 4,499,199
[45] Date of Patent: Feb. 12, 1985

[54] TICL4 TREATED WITH ORGANOMAGNESIUM/PROTONATING AGENT

[75] Inventor: Max P. McDaniel, Bartlesville, Okla.

[73] Assignee: Phillips Petroleum Company, Bartlesville, Okla.

[21] Appl. No.: 517,110

[22] Filed: Jul. 25, 1983

[51] Int. Cl.$^3$ ................................................. C08F 4/64
[52] U.S. Cl. ..................................... 502/104; 502/110; 502/115; 502/120; 502/122; 502/131; 526/140; 526/150; 260/429.7
[58] Field of Search ............... 502/104, 131, 122, 120, 502/110, 115

[56] References Cited

U.S. PATENT DOCUMENTS

| | | | |
|---|---|---|---|
| 3,009,908 | 11/1961 | Andersen | 502/122 X |
| 3,135,809 | 6/1964 | Bosmajian | 502/114 X |
| 3,449,263 | 6/1969 | Watt | 502/131 X |
| 3,625,864 | 12/1971 | Horvath | 252/430 |
| 3,660,519 | 5/1972 | Arakawa et al. | 502/122 X |
| 3,787,384 | 1/1974 | Stevens et al. | 260/94.9 DA |
| 3,809,657 | 5/1974 | Urham et al. | 252/429 C |
| 4,173,547 | 11/1979 | Graff | 252/429 B |

Primary Examiner—Patrick Garvin
Attorney, Agent, or Firm—French and Doescher

[57] ABSTRACT

An improved titanium catalyst is produced by contacting a titanium tetrahalide such as TiCl$_4$ with a catalyst precursor prepared by reacting a treating compound selected from mercaptans and tin hydroxides with an organometal such as a dialkyl magnesium compound. The resulting catalyst can either be supported or unsupported and it has been found to give high productivity and good particle size control in the production of olefin polymer such as polyethylene and also found to give a broad spectrum of molecular weight polymers including polymers having ultra high molecular weight and also narrow distribution polymers particularly suited for injection molding.

32 Claims, No Drawings

TICL₄ TREATED WITH ORGANOMAGNESIUM/PROTONATING AGENT

BACKGROUND OF THE INVENTION

It has long been known to use a porous support for olefin polymerization catalysts such as chromium. Unsupported catalyst such as titanium trichloride and titanium tetrachloride are well known as olefin polymerization catalysts. It is also known to utilize supported titanium halides as olefin polymerization catalysts but such supported compositions generally give low productivity.

SUMMARY OF THE INVENTION

It is the object of this invention to provide a supported titanium catalyst system;

It is a further object of this invention to provide an improved unsupported titanium catalyst;

It is a further object of this invention to provide a catalyst system capable of giving high productivity;

It is yet a further object of this invention to provide a catalyst system capable of giving polymers having a broad spectrum of molecular weights including ultra high molecular weight polymer;

It is yet a further object of this invention to provide an improved process for producing a catalyst;

It is yet a further object of this invention to provide an improved olefin polymerization process;

It is still yet a further object of this invention to produce an ultra high molecular weight polyethylene; and It is still yet a further object of this invention to produce narrow molecular weight distribution injection molding grade polyethylene In accordance with this invention, a catalyst precursor is formed by reacting an organomagnesium compound with a treating compound selected from organotin hydroxides and mercaptans and thereafter the thus formed precursor is combined with a titanium tetrahalide.

DESCRIPTION OF THE PREFERRED EMBODIMENTS

The invention encompasses both a supported system and an unsupported system. Each offers certain unexpected advantages. With the supported system, the polymer is produced in high productivity in the form of particles having the right size for easy handling. The unsupported systems give particularly high productivity and high molecular weight.

The catalyst precursor is produced by reacting an organomagnesium compound and a protonating agent (treating agent). The protonating agent is selected from tin compounds of the formula $R_3SnOH$ and mercaptans of the formula $RSH$ where R is a substituted or unsubstituted hydrocarbyl group containing from 1 to about 20 carbon atoms. Preferably in the case of the tin compound, the R group is an aryl group and preferably in the case of the mercaptan, the R is a 4 to 12 carbon atom alkyl radical.

The organomagnesium component is selected from Grignard reagents, or dihydrocarbylmagnesium compounds, Preferably, the organomagnesium compound is selected from dialkylmagnesium compounds, mixtures comprising dialkylmagnesium compounds and trialkylaluminum compounds and Grignard reagents in which each hydrocarbyl radical contains from about 1 to about 10 carbon atoms. The organomagnesium compounds are of the formula selected from $R'_2Mg$ and $R'MgX$ where R is a 1 to 10, preferably 2 to 6 carbon atom hydrocarbyl group. Preferably, the hydrocarbyl group is an alkyl group and X is a halogen, preferably chlorine. Di-n-butyl magnesium is especially suitable.

The catalyst precursor resulting from the reaction between the organomagnesium compound and the protonating agent is dissolved in a hydrocarbon solvent for the purpose of impregnating the precursor onto the support. Any normally liquid hydrocarbon solvent can be utilized but aryl hydrocarbons are preferred with toluene being most preferred.

The order of reacting these materials is critical. In a supported system, the porous support is impregnated with either the precursor and thereafter the titanium tetrahalide is incorporated, or the reverse order is used, i.e., the support is impregnated with the titanium tetrahalide and thereafter the precursor is incorporated. It is preferred to impregnate the porous support with the catalyst precursor and preferably dry the resulting treated support prior to contact with the titanium tetrahalide. The same conditions are used whichever order is employed. In the unsupported system, too, the precursor must be formed before contact with the titanium tetrahalide.

The halide of the titanium tetrahalide can be chlorine, iodine, fluorine, or bromine but is most preferably titanium tetrachloride.

Titanium tetrachloride is a liquid and hence can be contacted with the support neat. However, generally the titanium tetrahalide is carried in a solvent or diluent, generally a substituted or unsubstituted hydrocarbon solvent. Normally liquid alkanes such as normal heptane are particularly suitable.

This solvent or diluent can be the same or different from that used to carry the catalyst precursor.

The preferred procedure is simply to slurry the treated support with the liquid carrier containing the titanium tetrahalide and thereafter to wash the resulting thus impregnated support with an inert liquid such as a hydrocarbon. The preferred wash liquid is the same liquid as used as a carrier for the titanium tetrahalide and most preferably is a normally liquid hydrocarbon such as heptane. Washing at this point does not wash all of the materials back out which have just been impregnated into the support since contact of the treated support with the titanium component results in a reduction of the titanium component to an insoluble composition which becomes permanently attached to the support. After washing, the catalyst is dried under gentle conditions, for instance at a temperature of from room temperature up to 100° C. Either inert atmospheres such as nitrogen or argon can be used or a vacuum can be used. It is essential that the catalyst be kept away from air and other poisons in the same manner as unsupported titanium catalysts known in the art.

The base or support can be any porous support, such porous supports being known in the art. Alumina and silica are presently preferred. However, other supports such as aluminum phosphate, silica-alumina, silica-thoria, and other high surface area support materials can also be used.

In embodiments where there is no support, the precursor is simply formed and thereafter mixed with the titanium tetrahalide in a suitable diluent or solvent. This mixing can take place under the same conditions of temperature and atmosphere as when the support is present. The result of such mixing produces a precipitate which is then recovered, washed, and dried in the same manner as the supported product. The precursor can be added to the titanium tetrahalide or the titanium tetrahalide can be added to the precursor or the two separate streams can be introduced into a third container and mixed as they are simultaneously introduced.

With regard to the reaction between the organomagnesium compound and the protonating agent, a ratio of ingredients will generally be in the range of 0.1:1 to 5:1, preferably 0.5:1 to 2:1, most preferably 1:1 to 1.5:1 moles of protonating agent per mole of organometal. Generally about a stoichiometric amount is used. Reaction conditions can vary with temperatures from room temperature to the boiling point of the solvent being suitable. Because of the limited solubility of the resulting product, slight heating is preferred. Hence, a temperature of 50° C. to the boiling point of the solvent is preferred with 80° C. to the boiling point being most preferred. For convenience atmospheric pressure is generally used although pressure could be used which would thus extend the upper temperature limit.

The impregnation of the support with the catalyst precursor can be carried out at the same temperatures used in the reaction forming the precursor. In both the formation of the precursor and the impregnation onto the support, an inert ambient is used, i.e., nitrogen, argon or other nonreactive gas.

The contact between the titanium tetrahalide and the thus treated support can be carried out at any temperature from room temperature to the boiling point of the solvent. For convenience and economy room temperature is entirely satisfactory.

The support is activated in a manner known in the art prior to contact with the catalyst precursor. This can be what is conventionally known in the art as calcining by heating in air at a temperature of 300° to 900° C., preferably 400° to 700° C. for a time of at least 5 minutes, preferably 1 to 10 hours, more preferably 2 to 5 hours.

The ratio of ingredients is such that there is provided at least 1 atom of Ti per atom of Sn or S. Generally from 1–50 atoms of Ti to 1 atom of Sn or S are used. Preferably 1 to 10 atoms of titanium per atom of Sn or S is used with the excess being washed off. The amount of catalyst formed on the support can vary over a relatively wide range but generally there will be 1 to 50, preferably 5 to 40 weight percent precursor used based on the weight of the support.

The catalyst is generally used in conjunction with an organometal cocatalyst. The preferred organometal component of the cocatalyst is an organoaluminum, more preferably a trialkylaluminum wherein the alkyl group has from 1 to 5, preferably 2 to 4 carbon atoms. Triisobutylaluminum is particularly preferred. Organoaluminum halide compounds such as dihydrocarbylaluminum chloride and hydrocarbyl aluminum dichloride and mixtures thereof with trihydrocarbylaluminum compounds are also suitable. Thus broadly the preferred cocatalyst is one of the formula $R''_n AlX_{3-n}$ wherein n is an integer of 1 to 3 inclusive, X is a halogen, preferably chlorine and $R''$ is a 1 to 10 carbon atom alkyl group. Other suitable cocatalysts include lithium alkyls, Grignard reagents, dihydrocarbyl zinc compounds and organomagnesium compounds.

It is also within the scope of this invention to employ in the polymerization reaction one or more adjuvants, these being polar organic compounds, i.e., Lewis bases (electron donor compounds) with the titanium tetrahalide component or the cocatalyst component or both or as a separate stream to the reactor. Suitable compounds for this purpose are described in U.S. Pat. No. 3,642,746, the disclosure of which is hereby incorporated by reference. These include alcoholates, aldehydes, amides, amines, arsines, esters, ethers, ketones, nitriles, phosphines, phosphites, phosphoramides, sulfones, sulfoxides, and stibines. Exemplary compounds include sodium ethoxide, benzaldehyde, acetamide, triethyl amine, trioctyl arsine, ethyl acetate, diethyl ether, acetone, benzonitrile, triphenyl phosphine, triphenyl phosphite, hexamethyl phosphoric triamide, dimethyl sulfone, dibutyl sulfoxide, triethyl stibine, and N,N-dimethyl aniline.

Preferred esters are the lower alkyl esters (1 to 4 carbon atoms per molecule) of benzoic acid which may be additionally substituted in the para position to the carboxyl group with a mono radical. Exemplary compounds include ethyl anisate (ethyl-p-methoxy benzoate), methyl-p-toluate, methyl benzoate, ethyl benzoate, ethyl-p-dimethylamino benzoate, ethyl-p-trifluoromethyl benzoate, methyl-p-hydroxy-benzoate, methyl-p-acetyl benzoate, methyl-p-nitrobenzoate, ethyl-p-mercaptobenzoate, and mixures thereof. Generally, if an adjuvant is used at all, it is used in the polymerization of propylene. In the preferred embodiments of this invention where ethylene is polymerized, an adjuvant is generally not used. The molar ratio of organoaluminum compound(s) to adjuvant(s) is generally in the range of about 1:1 to 300:1. The molar ratio of titanium compound to adjuvant(s) is generally in the range of about 1:1 to 200:1. The atom ratio of aluminum to titanium can range from about 20:1 to about 10,000:1, more preferably from about 75:1 to about 5,000:1 where an organoaluminum cocatalyst is used. The atom ratio of aluminum to magnesium wherein an organoaluminum cocatalyst is used can range from about 0.1:1 to about 4:1, more preferably from about 0.5:1 to 2:1.

EXAMPLE I

This example illustrates the preparation of an olefin polymerization catalyst using triphenyltin hydroxide (Ph₃SnOH) as one of the reactants. 1.3 grams of triphenyltin hydroxide (supplied by Alpha Ventran, Danvers, Mass.) were dissolved in 40 mL of toluene. This solution was added with stirring to 10 mL of Magla, a mixture of 6 parts by weight of di-n-butyl magnesium and 1 part by weight of tributyl aluminum, said mixture being supplied by Texas Alkyls, Deer Park, Tex. The molar ratio of Sn:Mg in the formed Ph₃SnOH/Magla slurry was about 1:1.

Then 3.2 grams of essentially chromium-free silica (Davison grade 952, marketed by Davison Chemical Division of W. R. Grace and Co., Baltimore, Md.,; calcined at 750° C. overnight) were added to 9.0 mL of the above-described Ph₃SnOH/Magla mixture. The thus impregnated silica (containing about 0.5 weight-% Mg) was slurried in n-heptane. Then all solvents were evaporated, and a mixture of 1.0 mL of TiCl₄ and 9.0 mL n-heptane was added. The final catalyst slurry was heated to about 80° C. for about 15 minutes. Excess TiCl₄ was removed by decantation and washing with fresh n-heptane. The final invention catalyst, labeled Catalyst B, was then obtained after n-heptane was evaporated.

A control catalyst, labeled Catalyst A, was prepared essentially in accordance with the above-described procedure, except that no Ph₃SnOH was employed.

EXAMPLE II

This example illustrates the preparation of an olefin polymerization catalyst using tert-octyl mercaptan as one of the reagents. 0.73 mL of tert-octyl mercaptan (supplied by Aldrich Chemical Co., Milwaukee, Wis.) and 11.5 mL of Magla (see Example I) were dissolved in 20 mL of n-heptane. This solution was added to a slurry of 4.9 grams of calcined Davison grade 952 silica (see Example I) in n-heptane. After evaporation of the solvent, a mixture of 1.0 mL of $TiCl_4$ and 9.0 mL of n-heptane was added to the essentially dry impregnated silica. This slurry was heated to about 80° C. for about 15 minutes. Excess $TiCl_4$ was removed by decantation and washing with fresh n-heptane. The final invention catalyst, labeled Catalyst C, was recovered after n-heptane was evaporated.

EXAMPLE III

This example illustrates the polymerization of ethylene in the presence of the catalysts described in Example I. To a stirred 2-gallon stainless steel autoclave (Autoclave Engineering, Inc., Erie, Pa.) were charged: either 0.381 grams of Catalyst A (Run 1) or 0.537 grams of Catalyst B (Run 2) or 0.407 grams of Catalyst C (Run 3), plus 1.0 mL of a 15 weight-% tri-isobutyl aluminum cocatalyst solution (in n-heptane as solvent), 1.2 liters of isobutane, 100 psig of $H_2$ and 100 psig of ethylene. The reactor content was heated to about 80° C. for one hour while ethylene is continuously passed through the reactor so as to maintain a pressure of 370–380 psig. After venting and cooling, the formed polyethylene was recovered. Yield and pertinent polymer parameters are listed in Table I.

TABLE I

| Run | 1 (Control) | 2 (Invention) | 3 (Invention) |
|---|---|---|---|
| Catalyst | A | B | C |
| Amount of Catalyst (grams) | 0.381 | 0.537 | 0.407 |
| Yield (grams PE) | 121.6 | 195 | 224 |
| Productivity (g PE/g cat./hr) | 319 | 363 | 550 |
| Melt Index (MI)[1] | 4.9 | 1.1 | 1.5 |
| High Load Melt Index (HLMI) | 183 | 58 | 66.7 |
| HLMI/MI | 37 | 53 | 44 |

[1]determined in according to ASTM D1238-65T, Condition E
[2]determined according to ASTM D1238-65T, Condition F Data in Table I show that the inventive catalysts B and C exhibit two distinct advantages versus control Catalyst A: higher catalyst productivity and lower melt index (thus higher molecular weight) of the polyethylene produced on said catalysts.

EXAMPLE IV

This example illustrates the preparation of several olefin polymerization catalysts employing triphenyltin hydroxide as a reactant. 8.599 grams of triphenyltin hydroxide, 90 mL of toluene and 37.1 mL of a 0.633 molar solution of n-butyl-sec-butylmagnesium in n-heptane were added to an air-tight bottle. The formed mixture having a molar Sn:Mg ratio of about 1:1 was heated to boiling with stirring for about 30 minutes, while a portion of the solvent evaporated (final volume: about 75 mL). The reaction product, most likely $Ph_3Sn$-O-Mg-$C_4H_9$, was not completely dissolved, and the mixture appeared milky (Slurry A).

20 mL of Slurry A containing about 6.26 millimoles of the above-cited reaction produt and 50 mL of toluene were added to a second air-tight container and heated at 50° C. for about 15 minutes with stirring. To this warm, almost clear mixture 6.26 millimoles of $TiCl_4$ were added, and a brown precipitate formed. 5 cc of the slurry containing this precipitate (Slurry B) were withdrawn for a polymerization test.

To the remainder (about 65 mL) of Slurry B 1 mL of $TiCl_4$ was added. The mixture was heated at about 50° C. for 15 minutes. The supernatant liquid was decanted, and the precipitate was washed three times by slurrying with 100 mL n-heptane and subsequent decanting. The washed catalyst precipitate (about 5.81 mmoles) was reslurried in 70 mL heptane (Slurry C).

20 mL of Slurry A and 20 mL of toluene were mixed and heated to about 50° C. until the slurry turned opaque (almost clear). Then 4.1 grams of Davison HPV alumina (calcined in air at 600°; having a surface area of 540 $m^2$ as measured by the BET method with $N_2$, and a pore volume of 3.0 cc/gram as measured by mercury porosimetry; supplied by the Davison Chemical Division of W. R. Grace and Co., Baltimore, Md.) were added to the above slurry, and the solvent was evaporated. The dry, impregnated alumina powder was reslurried in heptane, and 1.0 mL of $TiCl_4$ was added dropwise. The first drop turned the alumina brown (while the color of the liquid did not visibly change) indicating that essentially all catalyst precursor (probably $Ph_3SnOMgC_4H_9$) was attached to the alumina. The catalyst slurry was refluxed for about 20 minutes, and then washed several times with excess n-heptane (as described earlier) to remove excess $TiCl_4$. The washed catalyst was reslurried in 50 mL of n-heptane (Slurry D).

1 mL of Slurry D was withdrawn for a polymerization run, and the remainder (45 mL) of the slurry was diluted with 50 mL of heptane (Slurry E).

The preparation of Slurry D was repeated as described above except that either 4.5 grams of Ketjen B alumina (calcined in air at 600° C.; 100–140 mesh; marketed by Armac, Company, Houston, Tex.) was used (Slurry F; 50 mL) or 4.3 grams of Davison SRA microspherical alumina (calcined 3 hours in air at 600° C.) was used (slurry G, total volume of the slurry: 150 mL).

EXAMPLE V

This example illustrates the polymerization of ethylene in the presence of the Sn-Mg-Ti catalysts described in Example III, essentially in accordance with the procedure outlined in Example II, with the following exceptions: (a) a different cocatalyst was used: 1.0 mL of a 25 weight-% solution triethyl aluminum in n-heptane; (b) the reactor temperature was higher: about 85°–105° C.; (c) run times were shorter (due to high catalyst activity): generally 5–30 minutes. Pertinent process parameters and polymer properties are summarized in Table II.

TABLE II

| | 4 (Invention) | 5 (Invention) | 6 (Invention) | 7 (Invention) | 8 (Invention) | 9 (Invention) | 10 (Invention) |
|---|---|---|---|---|---|---|---|
| Catalyst Slurry | B | C | C | D | E | F | G |
| Amount slurry (mL) | 5.0 | 5.5 | 1.0 | 1.0 | 1.0 | —[1] | 0.75 |

TABLE II-continued

|  | 4 (Invention) | 5 (Invention) | 6 (Invention) | 7 (Invention) | 8 (Invention) | 9 (Invention) | 10 (Invention) |
|---|---|---|---|---|---|---|---|
| Amount of Catalyst (mg) | 259 | 265 | 48.1 | 8.2 | 41.0 | 13.9 | 21.4 |
| Initial H$_2$ Pressure (psig) | 0 | 100 | 0 | 0 | 0 | 0 | 0 |
| Reactor Temperature T (°C.) | 85 | 90 | 85 | 105 | 101 | 84 | 85 |
| Total pressure at T (psig) | 550 | 560 | 550 | 550 | 545 | 555 | 550 |
| Reaction Time (minutes) | 30 | 4.9 | 7.5 | 19.5 | 5.0 | 35.4 | 31.4 |
| Yield (grams PE) | 132 | 220 | 117 | 212 | 172 | 141 | 257 |
| Productivity (KgPE/g catal./hr) | 1.02[2] | 10.2[2] | 19.6[2] | 8.0[3] | 45.9[3] | 17.2 | 22.9[3] |
| HLMI | 0 | 1.11 | — | 0.075 | 0 | — | 0 |
| Complex Dynamic Viscosity (megapoise)[4] at 230° C., 0.1 radians/sec. | 59.8 | 2.6 | — | 21.8 | — | 41.7 | — |

[1] dry catalyst was added.
[2] assuming that the catalyst was PH$_3$SnOMgCl—TiCl$_3$ (molecular weight: 580)
[3] based on weight of alumina support
[4] carried out with a Rheometrics Dynamic Spectrometer having parallel plate geometry; at 230° C., a strain amplitude of 1% and a strain frequency of 0.1 radians per second.

Data in Table II show that unsupported as well as Al$_2$O$_3$-supported invention catalyst were quite active and yielded polyethylene of ultra-high molecular weight at high productivity.

While this invention has been described in detail for the purpose of illustration, it is not to be construed as limited thereby but is intended to cover all changes and modifications within the spirit and scope thereof.

I claim:
1. A process comprising:
   (a) reacting an organomagnesium compound with a treating compound selected from those of the formula R$_3$SnOH or of the formula RSH wherein R is a hydrocarbyl group having 1 to 20 carbon atoms to give a catalyst precursor;
   (b) thereafter combining said precursor with a titanium tetrahalide in an amount sufficient to give at least one atom of Ti per atom of Sn or S; and
   (c) recovering a catalyst.
2. A method according to claim 1 wherein said titanium tetrahalide is titanium tetrachloride and said organomagnesium compound is a dialkylmagnesium compound.
3. A method according to claim 2 wherein said titanium tetrahalide is combined with a porous support to give a titanium treated support and thereafter said titanium treated support is combined with said catalyst precursor.
4. A method according to claim 2 wherein said catalyst precursor is impregnated onto a porous support to give a precursor treated support and thereafter said titanium tetrahalide is combined with said precursor treated support.
5. A method according to claim 2 wherein said dialkylmagnesium compound is of the formula R'$_2$Mg where R' is a 1 to 10 carbon atom alkyl group.
6. A method according to claim 5 wherein said R' has 2 to 6 carbon atoms.
7. A method according to claim 5 wherein said dialkylmagnesium compound is di-n-butylmagnesium.
8. A method according to claim 2 wherein said treating compound is of the formula R$_3$SnOH.
9. A method according to claim 8 wherein said hydrocarbyl group is aryl.
10. A method according to claim 9 wherein said R is phenyl.
11. A method according to claim 2 wherein said treating compound is of the formula RSH.
12. A method according to claim 11 wherein said R is alkyl.
13. A method according to claim 12 wherein said R is a tertiary alkyl.
14. A method according to claim 13 wherein said R is a tertiary octyl group.
15. A method according to claim 2 wherein said support is one of silica, alumina, aluminum phosphate, silica-alumina or silica-thoria.
16. A method according to claim 15 wherein said support is predominantly silica.
17. A method according to claim 15 wherein said support is predominantly alumina.
18. A method according to claim 4 wherein after said precursor is combined with said support, the thus treated support is washed with a liquid hydrocarbon and dried prior to being combined with said titanium tetrachloride.
19. A method according to claim 18 wherein said organomagnesium compound is di-n-butylmagnesium.
20. A method according to claim 19 wherein said treating compound is triphenyltin hydroxide.
21. A method according to claim 19 wherein said treating compound is tertiary-octyl mercaptan.
22. A method according to claim 2 wherein said catalyst precursor and said titanium tetrachloride are combined in the absence of a carrier.
23. A method according to claim 22 wherein said treating compound is triphenyltin hydroxide and said organometal is di-n-butylmagnesium.
24. A method according to claim 22 wherein said treating compound is tertiary-octyl mercaptan and said organometal is di-n-butylmagnesium.
25. A method according to claim 22 wherein said organometal is a dialkylmagnesium compound.
26. A product produced by the method of claim 1.
27. A product produced by the method of claim 4.
28. A product produced by the method of claim 8.
29. A product produced by the method of claim 11.
30. A product produced by the method of claim 18.
31. A product produced by the method of claim 23.
32. A product produced by the method of claim 24.